United States Patent
Zhu et al.

(10) Patent No.: US 10,531,289 B2
(45) Date of Patent: Jan. 7, 2020

(54) SECURE DATA TRANSMISSION APPARATUS AND METHOD

(71) Applicant: Huawei Technologies Co., Ltd., Shenzhen, Guangdong (CN)

(72) Inventors: Li Zhu, Xi'an (CN); Yingliang Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/115,464

(22) Filed: Aug. 28, 2018

(65) Prior Publication Data

US 2018/0367989 A1 Dec. 20, 2018

Related U.S. Application Data

(63) Continuation of application No. PCT/CN2016/091603, filed on Jul. 25, 2016.

(30) Foreign Application Priority Data

Feb. 29, 2016 (CN) .......................... 2016 1 0113629

(51) Int. Cl.
*H04W 12/02* (2009.01)
*G06F 21/74* (2013.01)
(Continued)

(52) U.S. Cl.
CPC ............ *H04W 12/02* (2013.01); *G06F 21/53* (2013.01); *G06F 21/575* (2013.01); *G06F 21/74* (2013.01);
(Continued)

(58) Field of Classification Search
CPC .................... H04W 12/02; G06F 21/50
See application file for complete search history.

(56) References Cited

U.S. PATENT DOCUMENTS

| | | | |
|---|---|---|---|
| 2014/0075502 A1* | 3/2014 | Aissi | G06F 21/60 726/1 |
| 2015/0067287 A1* | 3/2015 | Touzni | G06F 12/1483 711/163 |

(Continued)

FOREIGN PATENT DOCUMENTS

| | | |
|---|---|---|
| CN | 103761123 A | 4/2014 |
| CN | 103927170 A | 7/2014 |

(Continued)

OTHER PUBLICATIONS

PCT Written Opinion of the International Searching Authority for International application No. PCT/CN2016/091603 (translation), 6 pages, dated Oct. 28, 2016. (Year: 2016).*

(Continued)

*Primary Examiner* — Ponnoreay Pich
(74) *Attorney, Agent, or Firm* — Conley Rose, P.C.

(57) ABSTRACT

A secure data transmission apparatus includes: a dedicated communication signal processor, configured to send a first security interrupt to an application processor; and the application processor, configured to execute rich execution environment (REE) software, execute trusted execution environment (TEE) software under a trigger of the first security interrupt, and obtain first information from a shared memory of the dedicated communication signal processor and the application processor based on the first security interrupt. The dedicated communication signal processor is further configured to receive a second security interrupt sent by the application processor, and obtain second information from the shared memory. The application processor is further configured to send the second security interrupt to the dedicated communication signal processor.

24 Claims, 7 Drawing Sheets

(51) Int. Cl.
*H04W 12/08* (2009.01)
*H04W 4/80* (2018.01)
*G06F 21/53* (2013.01)
*G06F 21/57* (2013.01)
*H04L 29/06* (2006.01)
*H04W 4/14* (2009.01)
*H04W 84/12* (2009.01)

(52) U.S. Cl.
CPC ........... *H04L 63/0428* (2013.01); *H04W 4/14* (2013.01); *H04W 4/80* (2018.02); *H04W 12/08* (2013.01); *H04L 63/0853* (2013.01); *H04W 84/12* (2013.01)

(56) References Cited

U.S. PATENT DOCUMENTS

2016/0253670 A1* 9/2016 Kim .................. G06Q 20/4012 705/72
2017/0103378 A1 4/2017 Pan
2018/0367989 A1* 12/2018 Zhu ....................... H04W 12/02

FOREIGN PATENT DOCUMENTS

| | | |
|---|---|---|
| CN | 104778794 A | 7/2015 |
| CN | 105022970 A | 11/2015 |
| CN | 105307163 A | 2/2016 |
| CN | 105791284 A | 7/2016 |
| WO | 2015120972 A1 | 8/2015 |

OTHER PUBLICATIONS

Shiao-Li Tsao et al., "Performance Evaluation of Inter-Processor Communication for an Embedded Heterogeneous Multi-Core Processor", Journal of Information Science and Engineering, vol. 28, No. 3, 2012, pp. 537-554, XP055513028.

* cited by examiner

SECURE DATA TRANSMISSION APPARATUS AND METHOD

CROSS-REFERENCE TO RELATED APPLICATIONS

This application is a continuation of International Application No. PCT/CN2016/091603 filed on Jul. 25, 2016, which claims priority to Chinese Patent Application No. 201610113629.6 filed on Feb. 29, 2016. The disclosures of the aforementioned applications are hereby incorporated by reference in their entireties.

TECHNICAL FIELD

The present application relates to the field of system security technologies, and in particular, to a secure data transmission apparatus and method.

BACKGROUND

With rapid development of mobile networks and mobile terminals, application software is widely used in various fields, and more types of application software emerge. Software such as financial application software related to an electronic payment service, content copyright protection application software, or security application software for a thin client in cloud computing is related to immediate interests of users, and therefore has a relatively high security requirement.

However, a design of an operating system of a mobile terminal (also referred to as a terminal device) is originally intended to meet some functional requirements instead of high security. In addition, as the operating system is quite open, large, complex, and inevitably exposed to a corresponding system vulnerability, some malware attacks application software or intercepts information of application software by exploiting the system vulnerability. As a result, security of the application software is lowered. Currently, although the application software can be protected by using firewalls, anti-virus software, or the like, the application software cannot be thoroughly protected due to frequent system update and ever-emerging malware.

To address this issue, a solution is: An execution environment of a mobile terminal is divided into two mutually independent execution environments: a rich execution environment (REE) and a trusted execution environment (TEE) by using, for example, a TrustZone technology or a multi-central processing unit (CPU) technology. A currently common mobile operating system (for example, Android) is executed in the REE, and a secure operating system that is isolated is executed in the TEE, has simple functions and a small amount of code, and can be manually audited and controlled. A client application (CA) having a low security requirement runs in the REE. A trusted application (TA) having a high security requirement runs in the TEE, and provides a security service for a CA installed in a mobile operating system. For example, when a user uses the CA in a mobile terminal, if a sensitive operation such as electronic payment needs to be performed, the CA sends a request to the TA. After receiving the request, the TA performs a payment-related verification operation (for example, verifies whether a password is correct), and returns a verification success result to the CA. The CA proceeds with a subsequent step. In this way, leakage of data (for example, the foregoing password) is avoided.

A TEE technology can ensure security of data stored in the TEE and security of the TA. The TA can actually implement a same function as the CA. In an actual operating process, for a user, there is no significant difference between the TA and the CA, and security of the TA is higher than that of the CA. However, both TEE software and REE software run on an application processor (AP). Currently, the TA merely provides a security service for the CA. However, for a mobile terminal, a communication function is crucial, and most data of a user needs to be exchanged with the AP by using a peripheral such as a communications modem, a display screen, or a keyboard. Although the communications modem has an independent running environment and isolated software code, and the display screen and the keyboard may also be set to a security mode, a data transmission channel between the AP and the communications modem is open and insecure. Therefore, malware can still intercept related data when data is transmitted between the AP and the communications modem. Consequently, user data is leaked out, and security of a mobile terminal is lowered.

SUMMARY

Embodiments of the present disclosure provide a secure data transmission apparatus and method, to improve security of the apparatus.

To achieve the foregoing objective, the embodiments of the present disclosure use the following technical solutions:

According to a first aspect, a secure data transmission apparatus is provided. The apparatus includes a dedicated communication signal processor and an application processor. The dedicated communication signal processor is configured to send a first security interrupt to the application processor. The application processor is configured to: execute REE software, where the REE software includes a CA that runs in the REE; execute TEE software under a trigger of the first security interrupt, where the TEE software includes a TA that runs in the TEE; and under driving of the TA, obtain first information from a shared memory of the dedicated communication signal processor and the application processor based on the first security interrupt, where the first information needs to be transferred by the dedicated communication signal processor to the application processor, and security of the TEE software is higher than that of the REE software. The dedicated communication signal processor is further configured to receive a second security interrupt that is sent by the application processor, and obtain, from the shared memory based on the second security interrupt, second information that the application processor needs to transfer to the dedicated communication signal processor. The application processor is further configured to send the second security interrupt to the dedicated communication signal processor under the driving of the TA.

Optionally, the apparatus further includes the shared memory.

Optionally, the application processor is further configured to start the TEE based on a TEE startup parameter, where the TEE startup parameter includes an address index in the shared memory, used by the dedicated communication signal processor and the application processor.

Optionally, the apparatus further includes a read-only memory ROM. The ROM is configured to store a startup program of the secure data transmission apparatus. The application processor is further configured to configure the TEE startup parameter in a booting process of the startup program.

A program in the ROM cannot be rewritten. Therefore, this optional method can prevent leakage of the address index in the shared memory, used by the dedicated communication signal processor and the application processor.

Optionally, the second information is configuration information of a parameter specific to the dedicated communication signal processor. A priority of the configuration information that the application processor transfers to the dedicated communication signal processor under the driving of the TA is higher than a priority of configuration information that the application processor transfers to the dedicated communication signal processor under driving of the CA.

Optionally, the first information is indication information, feedback information, or first data information. When the first information is the indication information, the first information is used to instruct the application processor to operate correspondingly based on content of the indication information. When the first information is the feedback information, the first information is used to feedback, to the application processor, a processing result of the second information processed by the dedicated communication signal processor. When the first information is the first data information, the application processor is capable of processing the first data information based on a type of the first data information.

Optionally, the first data information is SMS message data or voice data.

Optionally, the second information is indication information, feedback information, or second data information. When the second information is the indication information, the second information is used to instruct the dedicated communication signal processor to operate correspondingly based on content of the indication information. When the second information is the feedback information, the second information is used to feedback, to the dedicated communication signal processor, a processing result of the first information processed by the application processor. When the second information is the second data information, the dedicated communication signal processor is capable of processing the second data information based on a type of the second data information.

Optionally, the second data information is network lock or SIM lock configuration information, data connection configuration information, or phone number information.

Optionally, the apparatus is a portable electronic device, a mobile terminal, a chip, or a chip set.

According to a second aspect, a secure data transmission method is provided. The method includes: storing, by a dedicated communication signal processor, first information that needs to be transferred to an application processor into a shared memory of the dedicated communication signal processor and the application processor; sending, by the dedicated communication signal processor, a first security interrupt to the application processor; executing a TEE in the application processor under a trigger of the first security interrupt, where the TEE includes a TA that runs in the TEE, the application processor further executes REE software, the REE software includes a CA that runs in the REE, and security of the TEE software is higher than that of the REE software; under driving of the TA, obtaining, by the application processor, the first information from the shared memory based on the first security interrupt; under the driving of the TA, storing, by the application processor, second information that needs to be transferred to the dedicated communication signal processor into the shared memory, and sending a second security interrupt to the dedicated communication signal processor; and obtaining, by the dedicated communication signal processor, the second information from the shared memory based on the second security interrupt that is received from the application processor.

Optionally, both the application processor and the dedicated communication signal processor belong to a secure data transmission apparatus, a read-only memory ROM of the secure data transmission apparatus includes a startup program of the secure data transmission apparatus, and the method further includes: configuring, by the application processor in a booting process of the startup program, a TEE startup parameter that includes an address index in the shared memory, used by the dedicated communication signal processor and the application processor; and starting, by the application processor, the TEE based on the TEE startup parameter.

A program in the ROM cannot be rewritten. Therefore, this optional method can prevent leakage of the address index in the shared memory, used by the dedicated communication signal processor and the application processor.

Optionally, the second information is configuration information of a parameter specific to the dedicated communication signal processor. A priority of the configuration information that the application processor transfers to the dedicated communication signal processor under the driving of the TA is higher than a priority of configuration information that the application processor transfers to the dedicated communication signal processor under driving of the CA.

Optionally, the first information is indication information, feedback information, or first data information. When the first information is the indication information, the first information is used to instruct the application processor to operate correspondingly based on content of the indication information. When the first information is the feedback information, the first information is used to feed back, to the application processor, a processing result of the second information processed by the dedicated communication signal processor. When the first information is the first data information, the application processor is capable of processing the first data information based on a type of the first data information.

Optionally, the first data information is SMS message data or voice data.

Optionally, the second information is indication information, feedback information, or second data information. When the second information is the indication information, the second information is used to instruct the dedicated communication signal processor to operate correspondingly based on content of the indication information. When the second information is the feedback information, the second information is used to feedback, to the dedicated communication signal processor, a processing result of the first information processed by the application processor. When the second information is the second data information, the dedicated communication signal processor is capable of processing the second data information based on a type of the second data information.

Optionally, the second data information is network lock or SIM lock configuration information, data connection configuration information, or phone number information.

According to the apparatus and method provided in the embodiments of the present disclosure, the dedicated communication signal processor and the application processor may store information by using the shared memory, and the dedicated communication signal processor and the application processor may obtain information stored in the shared memory by sending a security interrupt, so that a secure channel is established between the dedicated communication signal processor and the application processor, and the dedicated communication signal processor can securely transfer data to the application processor. This improves security of a terminal device.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
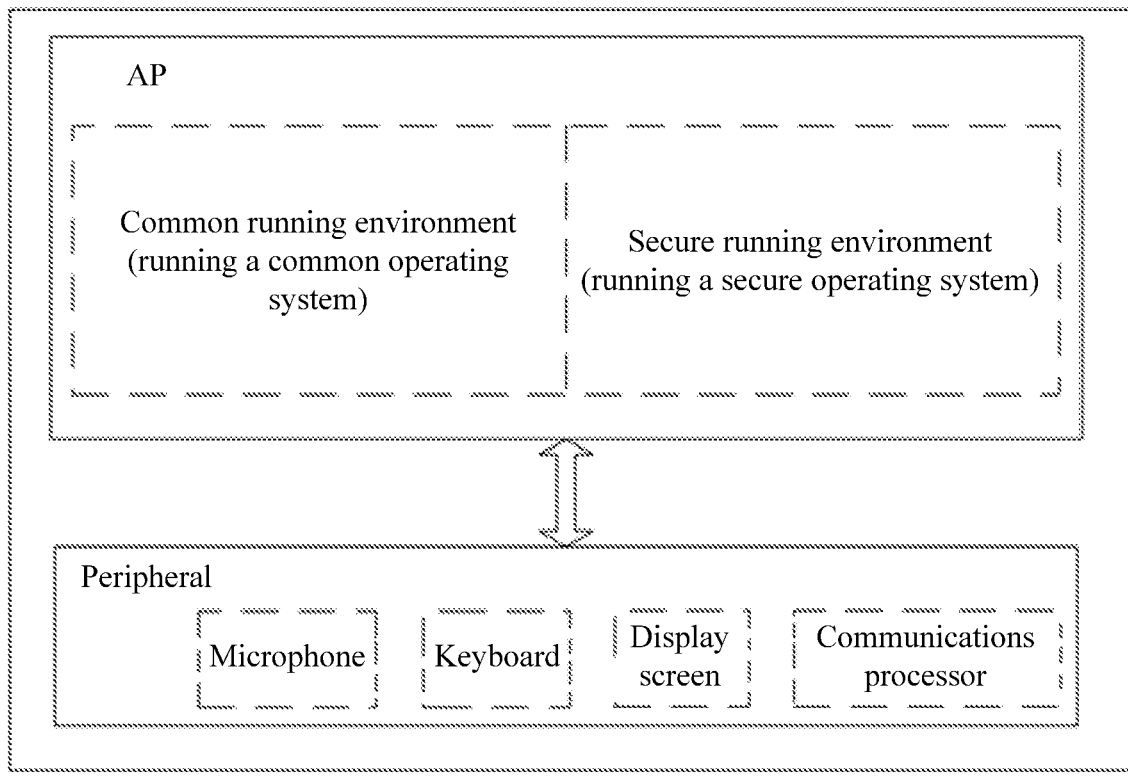
FIG. 1 is a schematic composition diagram of a terminal device in the prior art.

It should be noted that, an AP in the embodiments of the present disclosure may be a CPU, or the AP may include a CPU and CPU peripheral hardware, and REE software and TEE software run on the AP. For example, as shown in FIG. 1, FIG. 1 shows a terminal device. TEE software and REE software run on an AP in the terminal device. The terminal device further includes peripherals such as a microphone, a display screen, a keyboard, and a dedicated communication signal processor. A TA or a CA that runs on the AP can access a peripheral by using an interface between the AP and the peripheral. It should be noted that, when the TA accesses the peripheral, the peripheral is triggered to enter a security mode. In this case, the peripheral can be accessed only by the TA, and cannot be accessed by the CA. The terminal device further includes some necessary REE hardware, TEE hardware, and the like, which are not shown in the figure. Security of the TEE software or environment is higher than security of the REE software or environment, and therefore a security level of the TA is far higher than that of the CA. Most APP (Application) software or APK (Android Package) software usually installed by a user, namely the CA, is installed in the REE software environment. The TEE software environment is strictly restricted, and cannot be accessed by a common CA. Therefore, there is security isolation between the TEE software and the REE software, so as to ensure security of the TEE software and the CA.

Figure 2:
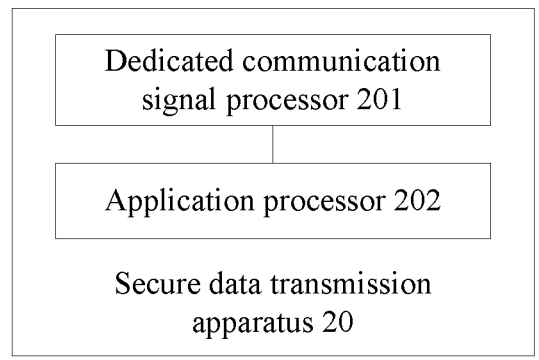
FIG. 2 is a schematic composition diagram of a secure data transmission apparatus according to an embodiment of the present disclosure.

An embodiment of the present disclosure provides a secure data transmission apparatus 20. As shown in FIG. 2, the secure data transmission apparatus 20 includes a dedicated communication signal processor 201 and an application processor 202.

The dedicated communication signal processor 201 is configured to send a first security interrupt to the application processor 202.

The application processor 202 is configured to: execute rich execution environment REE software, where the REE software includes a client application CA that runs in the REE; execute trusted execution environment TEE software under a trigger of the first security interrupt, where the TEE software includes a trusted application TA that runs in the TEE; and under driving of the TA, obtain first information from a shared memory of the dedicated communication signal processor 201 and the application processor 202 based on the first security interrupt, where the first information is information that the dedicated communication signal processor 201 needs to transfer to the application processor 202, and security of the TEE software is higher than that of the REE software.

The dedicated communication signal processor 201 is further configured to receive a second security interrupt sent by the application processor 202, and obtain second information from the shared memory based on the second security interrupt, where the second information is information that the application processor 202 needs to transfer to the dedicated communication signal processor 201.

The application processor 202 is further configured to send the second security interrupt to the dedicated communication signal processor 201 under the driving of the TA.

That the application processor 202 executes the TEE software under the trigger of the first security interrupt may be: The TEE environment enters a normal working state from a low-power consumption state. That is, although the TEE software or environment exists, the TEE software or environment is in a low-power consumption state: sleep or standby. Although the TEE environment is not completely disabled, some functions are disabled or unavailable. For example, at least some TA functions are unavailable. Further, the TEE software or environment may enter the normal running state under the trigger of the first security interrupt, so as to implement various functions related to the TA.

The secure data transmission apparatus 20 may be a terminal device, and specifically, may be a mobile phone, a tablet computer, or the like. In this specification, a method provided in the embodiments of the present disclosure is described by using an example in which the secure data transmission apparatus 20 is a terminal device.

It should be noted that a physical attribute of the shared memory is a security enabled state, and the dedicated communication signal processor 201 is in a security mode. When the physical attribute of the shared memory is the security enabled state, only the application processor under the driving of the TA or the dedicated communication signal processor in the security mode can access the shared memory by using a bus. That is, only the TEE and the TA that run on the AP can access the shared memory, and a common REE environment and the CA that run on the AP cannot access the shared memory. When the physical attribute of the shared memory is a non-security enabled state, that is, a common state, the common REE environment and the CA that run on the AP can access the shared memory.

Figure 3:
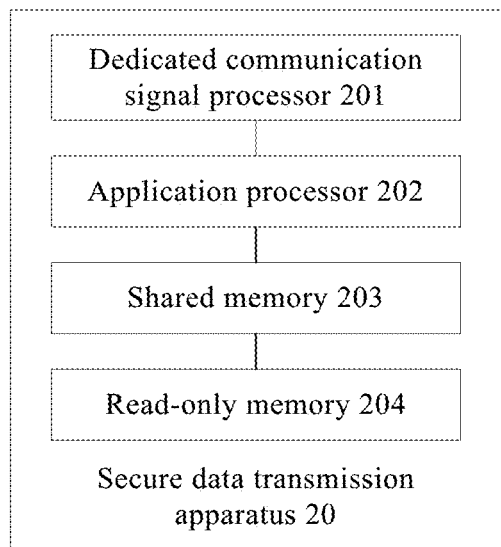
FIG. 3 is a schematic composition diagram of another secure data transmission apparatus according to an embodiment of the present disclosure.

Optionally, as shown in FIG. 3, the secure data transmission apparatus 20 further includes the shared memory 203.

Figure 4:
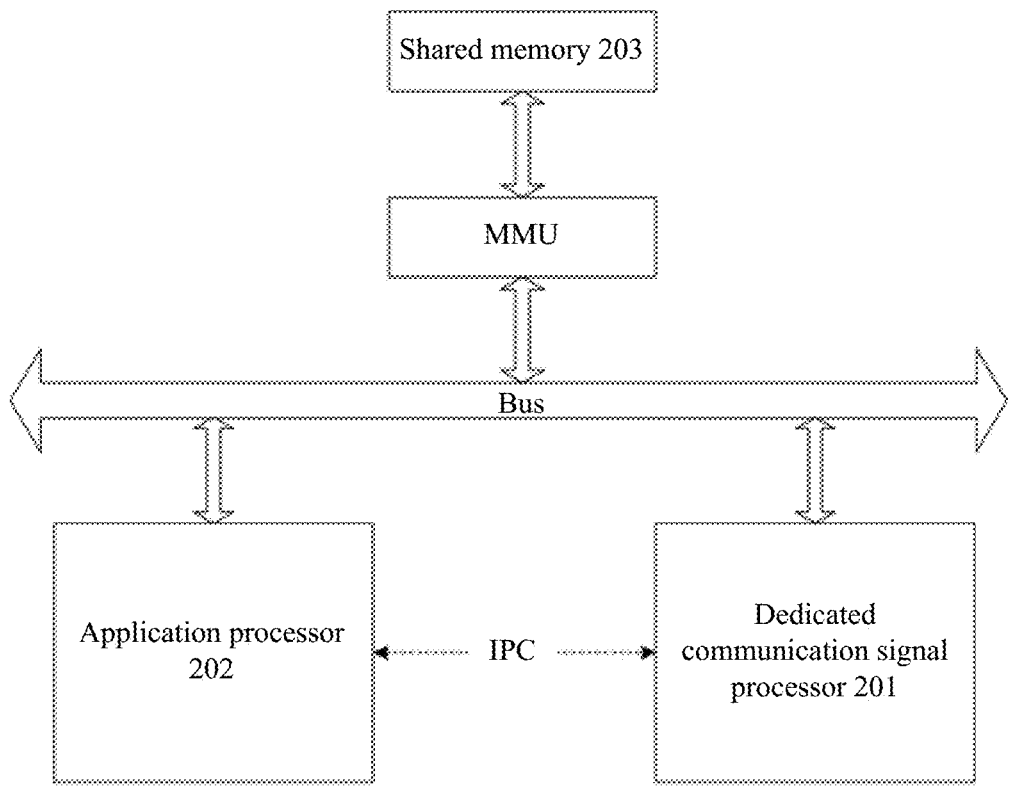
FIG. 4 is a schematic diagram of a connection among an AP, a shared memory, and a dedicated communication signal processor according to an embodiment of the present disclosure.

For example, as shown in FIG. 4, FIG. 4 is a schematic diagram of a connection relationship among the application processor 202, the dedicated communication signal processor 201, and the shared memory 203. A memory management unit (MMU), the application processor 202, and the dedicated communication signal processor 201 are pairwise connected by using a bus. The shared memory 203 is connected to the bus by using the MMU. Both the dedicated communication signal processor 201 in the security mode and the application processor 202 under the driving of the TA can access the shared memory 203 whose physical attribute is the security enabled state.

Specifically, in the embodiments of the present disclosure, the physical attribute of the shared memory 203 may be set to the security enabled state in the MMU. When the physical attribute of the shared memory 203 is the security enabled state, only the application processor 202 under the driving of the TA or the dedicated communication signal processor 201 in the security mode can access the shared memory 203 by using the bus.

Optionally, the dedicated communication signal processor 201 is a communications modem, a Bluetooth processor, a wireless fidelity (WiFi) processor, or a voice processor. Specifically, the communications modem may be a 2G, 3G, or 4G wireless communications modem. The voice processor may include a codec capable of implementing a voice function or a hi-fi (high-fidelity) processor capable of implementing voice compression or the like. It may be understood that the dedicated communication signal processor 201 and the application processor 202 may be integrated into one processor. The dedicated communication signal processor 201 and the application processor 202 in this specification may be an independent processor or a part of a functional circuit in a processor.

Specifically, as shown in FIG. 4, the dedicated communication signal processor 201 may send a security interrupt to the application processor 202 by using an inter processor communication (IPC) mechanism between the dedicated communication signal processor 201 and the application processor 202.

When a receiving party itself is in a non-security mode, a security interrupt that is sent by a sending party to the receiving party may trigger the receiving party to enter the security mode.

It should be noted that, there may be one or more application processors 202 used in this application. That is, a plurality of application processors 202 may jointly execute the REE software and the TEE software. A running manner may be: Some of the plurality of application processors 202 execute the REE software, and the other application processors 202 execute the TEE software; or the plurality of application processors 202 execute both the REE software and the TEE software.

Optionally, the first information is indication information, feedback information, or first data information. When the first information is the indication information, the first information is used to instruct the application processor 202 to operate correspondingly based on content of the indication information. When the first information is the feedback information, the first information is used to feed back, to the application processor 202, a processing result of the second information processed by the dedicated communication signal processor 201. When the first information is the first data information, the application processor 202 is capable of processing the first data information based on a type of the first data information.

Specifically, the first data information is SMS message data or voice data. When the first data information is the SMS message data, a type of the SMS message data is short message service, and the application processor 202 securely displays the SMS message data. When the first data information is the voice data, a type of the voice data is voice, and the application processor 202 securely plays the voice data or encrypts the voice data.

Optionally, the second information is indication information, feedback information, or second data information. When the second information is the indication information, the second information is used to instruct the dedicated communication signal processor 201 to operate correspondingly based on content of the indication information. When the second information is the feedback information, the second information is used to feed back, to the dedicated communication signal processor 201, a processing result of the first information processed by the application processor 202. When the second information is the second data information, the dedicated communication signal processor 201 is capable of processing the second data information based on a type of the second data information.

Specifically, the second data information is network lock or SIM lock configuration information, data connection configuration information, or phone number information. When the type of the second data information is configuration, the dedicated communication signal processor 201 parses this type of data and saves the data.

Optionally, the application processor 202 is further configured to start the TEE based on a TEE startup parameter. The TEE startup parameter includes an address index in the shared memory 203, used by the dedicated communication signal processor 201 and the application processor 202.

Optionally, as shown in FIG. 3, the secure data transmission apparatus 20 further includes a read-only memory (ROM) 204.

The ROM 204 is configured to store a startup program of the secure data transmission apparatus.

The application processor 202 is further configured to configure the TEE startup parameter in a booting process of the startup program.

Specifically, the address index in the shared memory 203, used by the dedicated communication signal processor 201 and the application processor 202 may be added to the startup program in the ROM through predeclaration (for example, macro definition). In a startup process of the secure data transmission apparatus 20, the startup program in the ROM boots a fastboot program. The fastboot program configures the TEE startup parameter. The TEE startup parameter includes the address index in the shared memory 203, used by the dedicated communication signal processor 201 and the application processor 202. The TEE starts based on the TEE startup parameter. A program in the ROM cannot be rewritten. Therefore, this optional method can prevent leakage of the address index in the shared memory 203.

Optionally, the second information is configuration information of a parameter specific to the dedicated communication signal processor 201. A priority of the configuration information that the application processor 202 transfers to the dedicated communication signal processor 201 under the driving of the TA is higher than a priority of configuration information that the application processor 202 transfers to the dedicated communication signal processor 201 under driving of the CA.

In this case, the configuration information that the application processor 202 transfers to the dedicated communication signal processor 201 under the driving of the TA is not rewritten by the CA. In addition, even though some malware tampers with, in the dedicated communication signal processor 201, the configuration information that the application processor 202 transfers to the dedicated communication signal processor 201 under the driving of the TA, the secure data transmission apparatus 20 still operates based on the configuration information that the application processor 202 transfers to the dedicated communication signal processor 201 under the driving of the TA, so that security of the secure data transmission apparatus 20 is further improved.

Optionally, the parameter includes at least one of an Internet Protocol (IP) type, an access point name (APN), a user name, a password, an authentication type, or quality of service (QOS).

According to the apparatus provided in this embodiment of the present disclosure, the dedicated communication signal processor and the application processor may store information by using the shared memory, and the dedicated communication signal processor and the application processor may obtain, by sending a security interrupt, information stored in the shared memory, so that a secure channel is established between the dedicated communication signal processor and the application processor, and the dedicated communication signal processor can securely transfer data to the application processor. This improves security of the terminal device.

Figure 5:
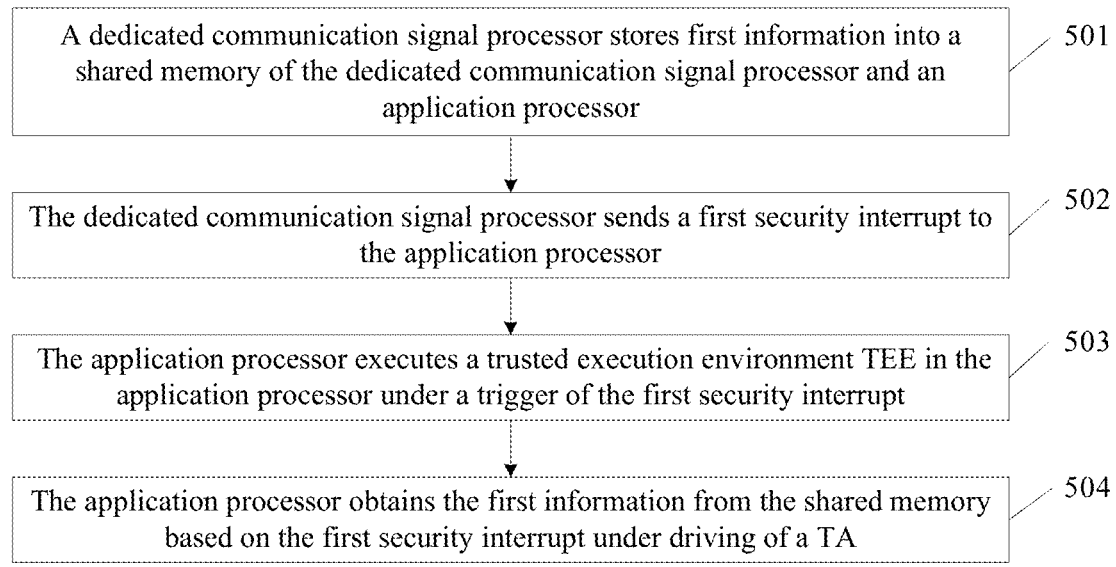
FIG. 5 is a flowchart of a secure data transmission method according to an embodiment of the present disclosure.

An embodiment of the present disclosure further provides a secure data transmission method. As shown in FIG. 5, the method includes the following steps.

501. A dedicated communication signal processor stores first information into a shared memory of the dedicated communication signal processor and an application processor.

The first information is information that the dedicated communication signal processor needs to transfer to the application processor. A physical attribute of the shared memory is a security enabled state, and the dedicated communication signal processor is in a security mode.

Optionally, the dedicated communication signal processor is a communications modem, a Bluetooth processor, a WiFi processor, or a voice processor. Specifically, the communications modem may be a 2G, 3G, or 4G wireless communications modem. The voice processor may include a codec capable of implementing a voice function or a hi-fi processor capable of implementing voice compression or the like. It may be understood that the dedicated communication signal processor and the application processor may be integrated into one processor. The dedicated communication signal processor and the application processor in this specification may be an independent processor or a part of a functional circuit in a processor.

It should be noted that, there may be one or more application processors used in this application. That is, a plurality of application processors may jointly execute REE software and TEE software. A running manner may be: Some of the plurality of application processors execute the REE software, and the other application processors execute the TEE software; or the plurality of application processors execute both the REE software and the TEE software.

Specifically, the first information is indication information, feedback information, or first data information. When the first information is the indication information, the first information is used to instruct the application processor to operate correspondingly based on content of the indication information. When the first information is the feedback information, the first information is used to feedback, to the application processor, a processing result of the second information processed by the dedicated communication signal processor. When the first information is the first data information, the application processor is capable of processing the first data information based on a type of the first data information.

Optionally, the first data information is SMS message data or voice data.

The first information may be data in a message that is sent by an external network and that is received by the dedicated communication signal processor. In this case, the message that is sent by the external network and that is received by the dedicated communication signal processor may vary with a type of the dedicated communication signal processor. For example, when the dedicated communication signal processor is a communications modem, the message that is sent by the external network and that is received by the communications modem may be an SMS message; or when the dedicated communication signal processor is a voice processor, the message that is sent by the external network and that is received by the voice processor may be a voice message. The first information may be information fed back to the application processor after the dedicated communication signal processor receives information transferred by the application processor, and operates based on the information. Certainly, the first information may be other information (for example, instruction information). This is not limited in this embodiment of the present disclosure.

502. The dedicated communication signal processor sends a first security interrupt to the application processor.

Specifically, the dedicated communication signal processor may send a security interrupt to the application processor by using an IPC mechanism between the dedicated communication signal processor and the application processor.

When a receiving party itself is in a non-security mode, a security interrupt that is sent by a sending party to the receiving party may trigger the receiving party to enter the security mode.

503. The application processor executes a trusted execution environment TEE in the application processor under a trigger of the first security interrupt.

The TEE includes a trusted application TA that runs in the TEE. The application processor further executes rich execution environment REE software. The REE software includes a client application CA that runs in the REE. Security of the TEE software is higher than that of the REE software.

504. The application processor obtains the first information from the shared memory based on the first security interrupt under driving of the TA.

Specifically, after the TEE is executed, an unprocessed message is detected, and the TA is notified to process the message. Specifically, after the TEE instructs the TA to process the first security interrupt, the TA obtains the first information from the shared memory.

Specifically, when the first information is the first data information, the TA operates corresponding to the first data information based on the first data information. When the first data information is the SMS message data, the TA displays the SMS message data by using a display screen. When the first data information is the voice data, the TA plays the voice data by using a microphone. It should be noted that peripherals such as the display screen and the microphone need to be in the security mode, so that the REE cannot access a peripheral while the TEE accesses the peripheral, thereby improving data security. When the first information is information fed back to the application processor after the dedicated communication signal processor receives information transferred by the application processor and operates based on the information, the TA may determine whether the dedicated communication signal processor successfully operates based on the first information.

Figure 6:
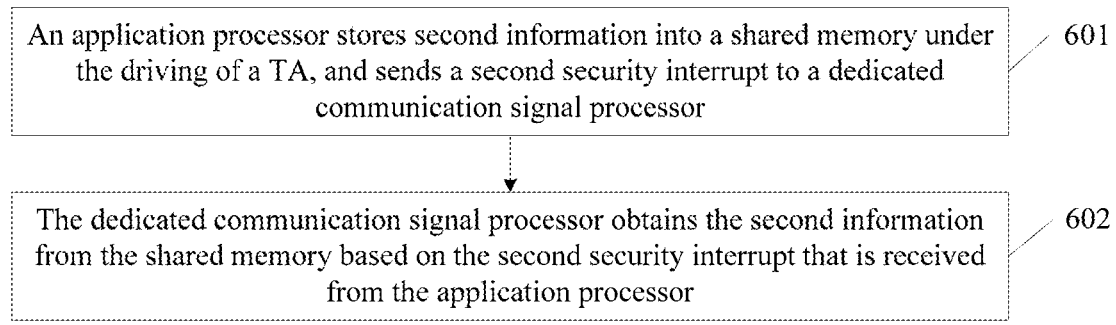
FIG. 6 is a flowchart of another secure data transmission method according to an embodiment of the present disclosure.

In an application scenario, the application processor needs to transfer second information to the dedicated communication signal processor. In this case, as shown in FIG. 6, the foregoing method further includes the following steps.

601. The application processor stores the second information into the shared memory under the driving of the TA, and sends a second security interrupt to the dedicated communication signal processor.

The second information is information that the application processor needs to transfer to the dedicated communication signal processor.

Optionally, the second information is indication information, feedback information, or second data information. When the second information is the indication information, the second information is used to instruct the dedicated communication signal processor to operate correspondingly based on content of the indication information. When the second information is the feedback information, the second information is used to feedback, to the dedicated communication signal processor, a processing result of the first information processed by the application processor. When the second information is the second data information, the dedicated communication signal processor is capable of processing the second data information based on a type of the second data information.

Specifically, the second data information is network lock or SIM lock configuration information, data connection configuration information, or phone number information.

602. The dedicated communication signal processor obtains the second information from the shared memory based on the second security interrupt that is received from the application processor.

Specifically, when the dedicated communication signal processor is in a non-security mode, the second security interrupt may further trigger the dedicated communication signal processor to enter the security mode, so that the dedicated communication signal processor can obtain the second information from the shared memory.

For example, a user needs to securely display SMS messages sent by banks. In this case, the second information may be a number list including numbers of all the banks and indication information, and the indication information is information used to instruct the dedicated communication signal processor to securely transmit data in an SMS message from a sending party whose number is in the number list. In this case, the dedicated communication signal processor stores the number list in the second information, and when receiving an SMS message from a sending party whose number is in the number list, the dedicated communication signal processor stores data in the SMS message into the shared memory, and sends a security interrupt to the application processor, so that the application processor obtains the data in the SMS message. For another example, a user needs to securely display any received SMS message. In this case, the second information may be instruction information. The instruction information is used to instruct the dedicated communication signal processor to securely transfer data in the received SMS message to the application processor. When receiving an SMS message, the dedicated communication signal processor stores data in the SMS message into the shared memory, and sends a security interrupt to the application processor, so that the application processor obtains the data in the SMS message.

It should be noted that the "first" and "second" in the first security interrupt and the second security interrupt (or the first data information and the second data information) in this embodiment are merely used to differentiate different security interrupts (or data information), and are not construed as a limitation. The security interrupt in this embodiment may be a hardware interrupt or a software interrupt. This is not limited in this embodiment of the present disclosure.

Optionally, both the application processor and the dedicated communication signal processor belong to a secure data transmission apparatus. A ROM of the secure data transmission apparatus includes a startup program of the secure data transmission apparatus, and the method further includes:

configuring, by the application processor, a TEE startup parameter in a booting process of the startup program, where the TEE startup parameter includes an address index in the shared memory, used by the dedicated communication signal processor and the application processor; and starting, by the application processor, the TEE based on the TEE startup parameter.

Specifically, the address index in the shared memory, used by the dedicated communication signal processor and the application processor is added to the startup program in the ROM through predeclaration (for example, macro definition). In a startup process of the secure data transmission apparatus, the startup program in the ROM boots a fastboot program. The fastboot program configures the TEE startup parameter. The TEE startup parameter includes the address index in the shared memory, used by the dedicated communication signal processor and the application processor. The TEE starts based on the TEE startup parameter. A program in the ROM cannot be rewritten. Therefore, this optional method can prevent leakage of the address index in the shared memory.

Optionally, the second information is configuration information of a parameter specific to the dedicated communication signal processor. A priority of the configuration information that the application processor transfers to the dedicated communication signal processor under the driving of the TA is higher than a priority of configuration information that the application processor transfers to the dedicated communication signal processor under driving of the CA.

In this case, the configuration information that the TA transfers to the dedicated communication signal processor is not rewritten by the CA. In addition, even though some malware tampers with, in the dedicated communication signal processor, the configuration information that the CA transfers to the dedicated communication signal processor, the terminal device still operates based on the configuration information that the TA transfers to the dedicated communication signal processor. In this way, security of the terminal device is further improved.

Optionally, the parameter includes at least one of an IP type, an APN, a user name, a password, an authentication type, or QoS.

According to the method provided in this embodiment of the present disclosure, the dedicated communication signal processor and the application processor may store information by using the shared memory, and the dedicated communication signal processor and the application processor may obtain information stored in the shared memory by sending a security interrupt, so that a secure channel is established between the dedicated communication signal processor and the application processor, and the dedicated communication signal processor can securely transfer data to the application processor. This improves security of the terminal device.

Figure 7:
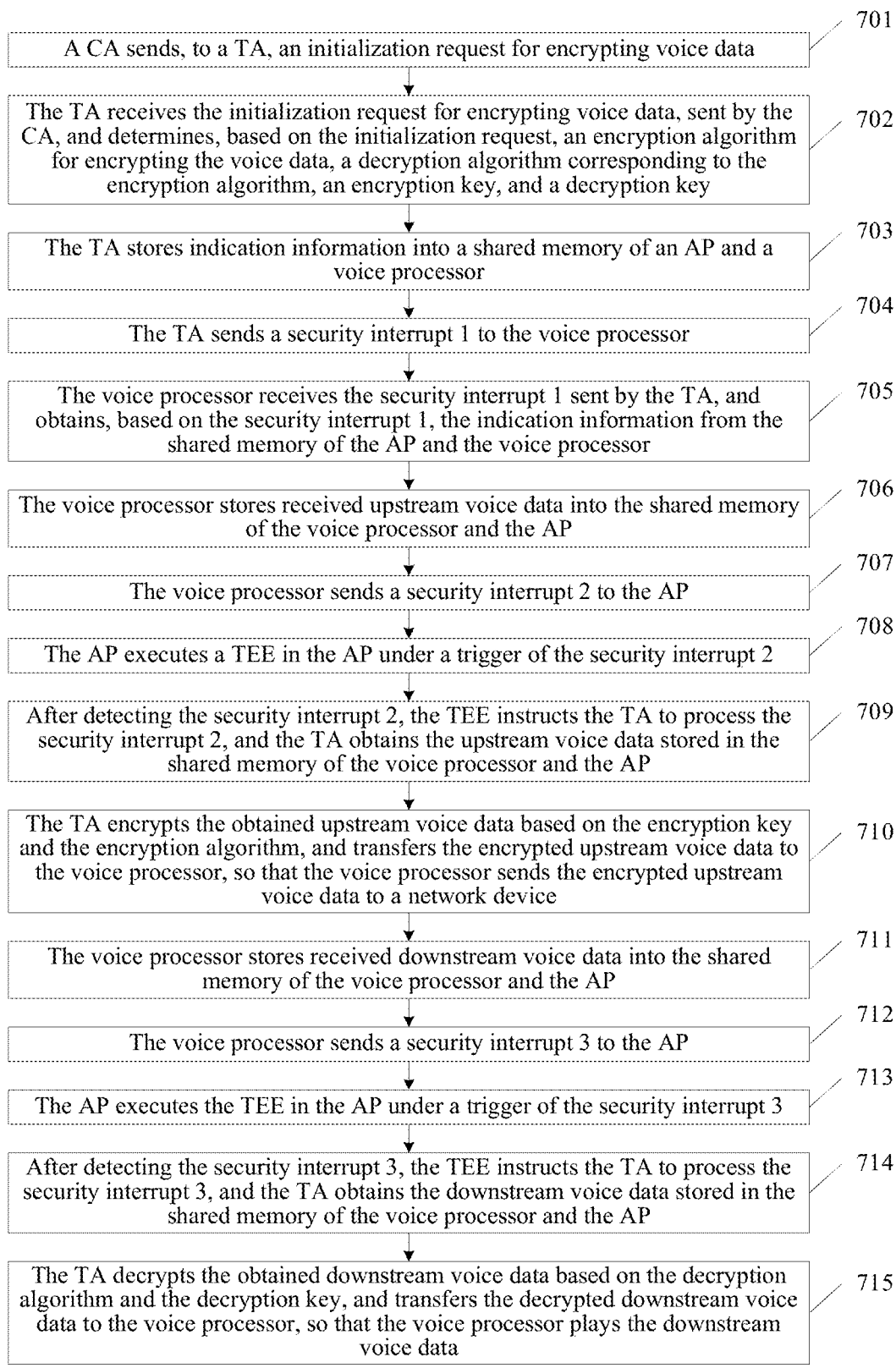
FIG. 7 is a flowchart of another secure data transmission method according to an embodiment of the present disclosure.

In an application scenario, to ensure security of voice data that is sent or received by the terminal device, the voice data sent by the terminal device needs to be encrypted, and the received voice data needs to be decrypted. In this application scenario, the dedicated communication signal processor is a voice processor. As shown in FIG. 7, the method includes the following steps.

701. The CA sends, to the TA, an initialization request for encrypting voice data.

The CA may be a dial-up application (that is, an application program capable of dialing a phone number). A trigger condition of step 701 may be that a user dials a phone number by using the CA, or may be that after a terminal device is powered on, the CA sends, to the TA, the initialization request for encrypting voice data.

The initialization request includes request information for requesting the TA to determine an encryption algorithm, a decryption algorithm, and a key.

702. The TA receives the initialization request for encrypting voice data, sent by the CA, and determines, based on the initialization request, an encryption algorithm for encrypting the voice data, a decryption algorithm corresponding to the encryption algorithm, an encryption key, and a decryption key.

The encryption algorithm may be an Advanced Encryption Standard (AES) algorithm, a Data Encryption Standard (DES) algorithm, or another encryption algorithm. This is not specifically limited in this embodiment of the present disclosure.

Specifically, the encryption algorithm may be an encryption algorithm determined by the TA and the CA through negotiation, or may be an encryption algorithm determined by the TA itself, for example, an encryption algorithm that is randomly selected from a plurality of encryption algorithms by using a random algorithm.

703. The TA stores indication information into a shared memory of the AP and the voice processor.

Specifically, the indication information is used to instruct the voice processor to securely transfer, to the AP, voice data that needs to be sent or received voice data.

704. The TA sends a security interrupt 1 to the voice processor.

The voice processor may be a high-fidelity processor or another voice processor.

705. The voice processor receives the security interrupt 1 sent by the TA, and obtains the indication information from the shared memory of the AP and the voice processor based on the security interrupt 1.

When receiving upstream voice data, the voice processor performs steps 706 to 710. The upstream voice data is voice data that the terminal device sends to a network device. For example, the voice processor receives upstream analog voice data that is input by a user by using a microphone, and performs voice codec processing on the upstream analog voice data, to convert the upstream analog voice data to a quantized digital voice signal. The digital signal is upstream voice data.

706. The voice processor stores received upstream voice data (data from a user) into the shared memory of the voice processor and the AP.

707. The voice processor sends a security interrupt 2 to the AP.

708. The AP executes a TEE in the AP under a trigger of the security interrupt 2. Because there may be no task in the TEE environment of the AP during a preset time previously, the TEE environment can automatically enter a low-power consumption state. In this case, the TEE software or environment may enter a normal working state under the trigger of the interrupt 2.

709. After detecting the security interrupt 2, the TEE instructs the TA to process the security interrupt 2, and the TA obtains the upstream voice data stored in the shared memory of the voice processor and the AP.

710. The TA encrypts the obtained upstream voice data based on the encryption key and the encryption algorithm, and transfers the encrypted upstream voice data to the voice processor, so that the voice processor sends the encrypted upstream voice data to the network device by using a communications modem.

Specifically, the voice processor transmits the upstream voice data to the communications modem in the terminal device, and the communications modem sends the upstream voice data to the network device.

When receiving downstream voice data transferred by the communications modem, the voice processor performs steps 711 to 715. The downstream voice data is voice data that is sent by the network device to the terminal device. Specifically, the communications modem receives the downstream voice data from the network device, and transfers the downstream voice data to the voice processor.

711. The voice processor stores received downstream voice data into the shared memory of the voice processor and the AP.

712. The voice processor sends a security interrupt 3 to the AP.

713. The AP executes the TEE in the AP under a trigger of the security interrupt 3. Because there may be no task in the TEE environment of the AP during a preset time previously, the TEE environment can automatically enter the low-power consumption state. In this case, the TEE software or environment may enter the normal working state under the trigger of the interrupt 3.

714. After detecting the security interrupt 3, the TEE instructs the TA to process the security interrupt 3, and the TA obtains the downstream voice data stored in the shared memory of the voice processor and the AP.

715. The TA decrypts the obtained downstream voice data based on the decryption algorithm and the decryption key, and transfers the decrypted downstream voice data to the voice processor, so that the voice processor plays the downstream voice data.

Specifically, all data transferred between the TA and the voice processor may be transferred by using the shared memory.

When a voice call ends or the terminal device is powered off, after step 715, the CA may further send a data clearing request to the TA, so that the TA instructs the voice processor to clear data related to the voice call.

In the prior art, after receiving voice data, the voice processor transfers the voice data to the CA, and then the CA requests the TA to encrypt or decrypt the voice data. As a data transmission channel between the voice processor and the CA is insecure, the voice data may be leaked out. According to the method provided in this application, as the voice data is directly transmitted on a secure data transmission channel between the TA and the voice processor, voice data security can be improved.

Figure 8:
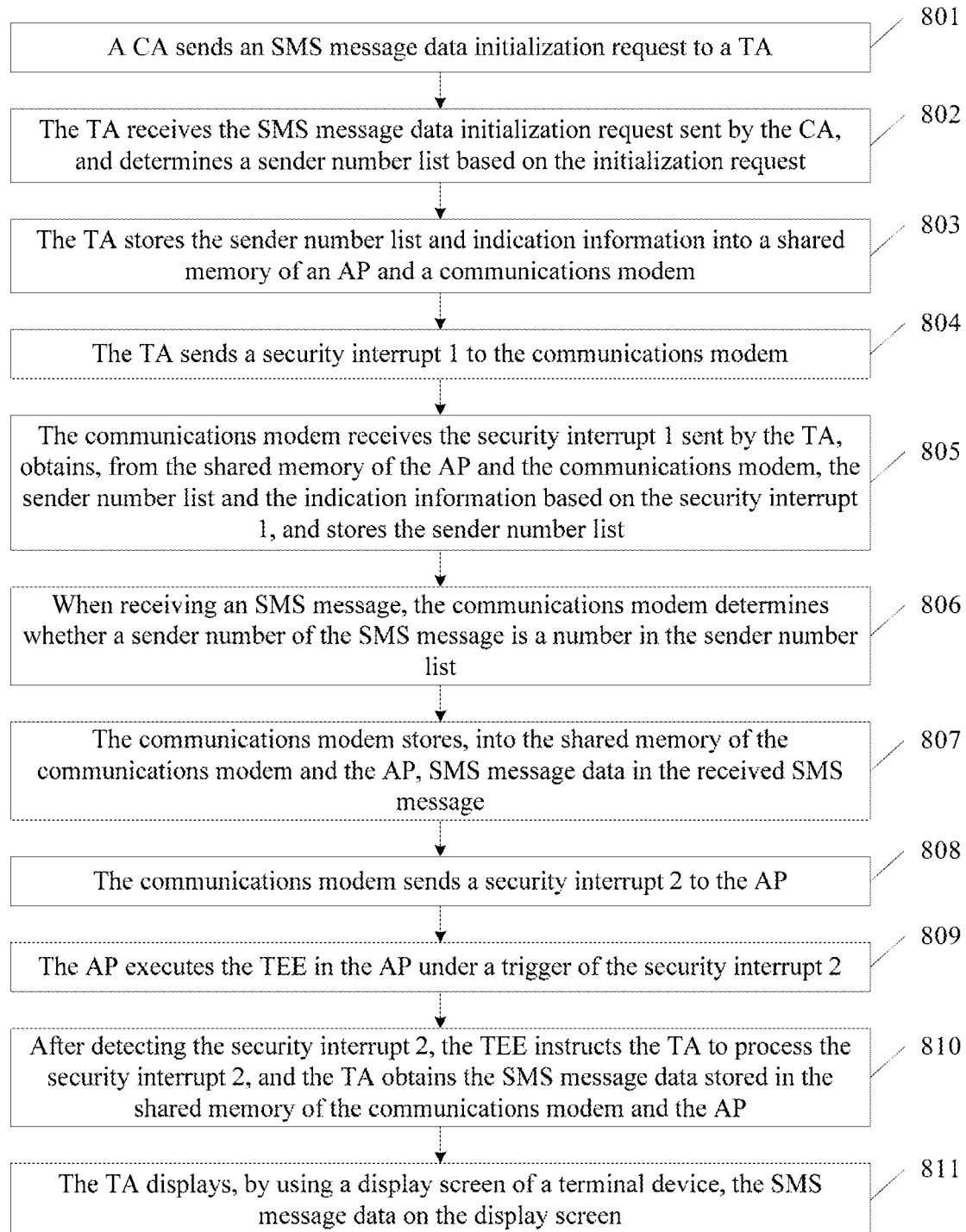
FIG. 8 is a flowchart of another secure data transmission method according to an embodiment of the present disclosure.

In another application scenario, to prevent leakage of SMS message data sent by some sending parties, the SMS message data of the sending parties needs to be securely transmitted and displayed on a terminal device. In this case, the dedicated communication signal processor is a communications modem. As shown in FIG. 8, the method includes the following steps.

801. The CA sends an SMS message data initialization request to the TA.

The CA may be an SMS application (that is, an application program capable of sending an SMS message). After the terminal device is powered on, the CA sends the SMS message data initialization request to the TA.

802. The TA receives the SMS message data initialization request sent by the CA, and determines a sender number list based on the initialization request.

An SMS message that is sent by using a number in the sender number list is an SMS message that needs to be securely transmitted and displayed.

Specifically, the CA may directly add the number in the sender number list to the initialization request, or the TA may instruct, under a trigger of the initialization request, a user to enter a related number.

For example, the numbers in the sender number list may be numbers of banks, or the numbers in the sender number list may be some numbers preset by the user.

803. The TA stores the sender number list and indication information into the shared memory of the AP and the communications modem.

Specifically, the indication information is used to instruct the communications modem to securely transmit, to the TA, SMS message that is received from the number in the sender number list.

804. The TA sends a security interrupt 1 to the communications modem.

805. The communications modem receives the security interrupt 1 sent by the TA, obtains, from the shared memory of the AP and the communications modem, the sender number list and the indication information based on the security interrupt 1, and stores the sender number list.

806. When receiving an SMS message, the communications modem determines whether a sender number of the SMS message is a number in the sender number list.

If the sender number of the SMS message is a number in the sender number list, steps 807 to 811 are performed. If the sender number of the SMS message is not a number in the sender number list, the SMS message is displayed by using a prior-art method (that is, the SMS message is displayed by using the CA).

807. The communications modem stores, into the shared memory of the communications modem and the AP, SMS message data in the received SMS message.

808. The communications modem sends a security interrupt 2 to the AP.

809. The AP executes the TEE in the AP under a trigger of the security interrupt 2. Because there may be no task in the TEE environment of the AP during a preset time previously, the TEE environment can automatically enter the low-power consumption state. In this case, the TEE software or environment may enter the normal working state under the trigger of the interrupt 2.

810. After detecting the security interrupt 2, the TEE instructs the TA to process the security interrupt 2, and the TA obtains the SMS message data stored in the shared memory of the communications modem and the AP.

811. The TA displays, by using a display screen of the terminal device, the SMS message data on the display screen.

When the terminal device is powered off, after step 811, the CA may further send a data clear request to the TA, so that the TA instructs the communications modem to clear information such as the sender number list.

In the prior art, to ensure security of SMS message data, after receiving the SMS message data, the communications modem transfers the SMS message data to the CA, and then the CA requests the TA to securely display the SMS message data. As a data transmission channel between the communications modem and the CA is insecure, the SMS message data may be leaked out. According to the method provided in this application, as the SMS message data is directly transmitted between a secure data transmission channel between the TA and the communications modem, security of the SMS message data can be improved.

Figure 9:
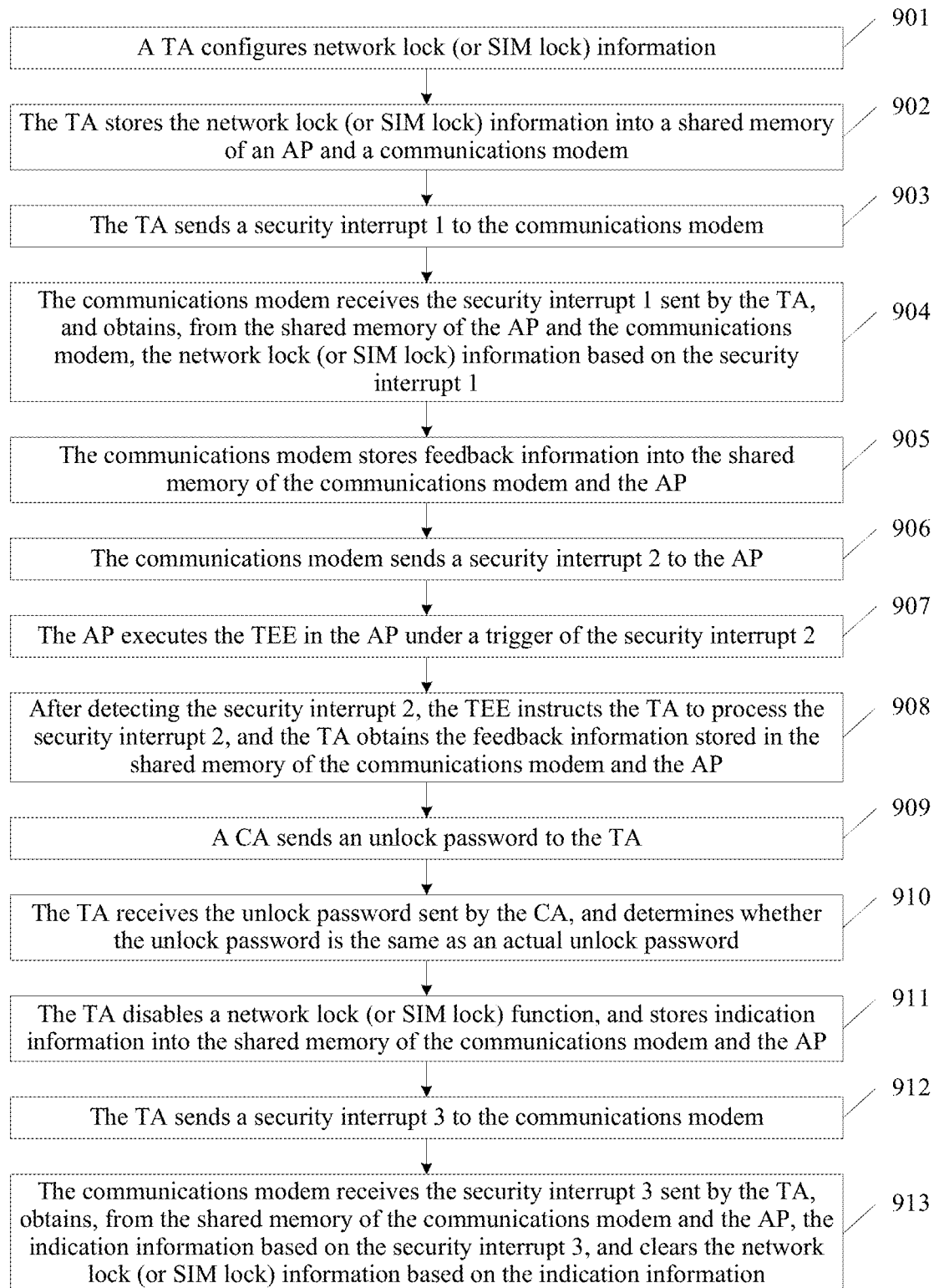
FIG. 9 is a flowchart of another secure data transmission method according to an embodiment of the present disclosure.

In another application scenario, to prevent a network lock (or SIM lock) function failure of a terminal device from compromising profits of an operator, as shown in FIG. 9, the method includes the following steps.

901. The TA configures network lock (or SIM lock) information.

Specifically, the terminal device may perform step 901 each time when the terminal device is powered on.

In this case, the dedicated communication signal processor is a communications modem.

Network lock (or SIM lock) configuration information may specifically include information about a locked network (or a locked subscriber identity module (SIM) card) and the like.

902. The TA stores the network lock (or SIM lock) information into a shared memory of the AP and the communications modem.

903. The TA sends a security interrupt 1 to the communications modem.

904. The communications modem receives the security interrupt 1 sent by the TA, and obtains, from the shared memory of the AP and the communications modem, the network lock (or SIM lock) information based on the security interrupt 1.

After obtaining the network lock (or SIM lock) information, the communications modem identifies a network (or a SIM card) used or to be used by a user based on the network lock (or SIM lock) information. If information about the network (or the SIM card) used or to be used by the user is different from the network lock (or SIM lock) information, no service is provided, that is, the user is forbidden to use a corresponding network (or SIM card).

905. The communications modem stores feedback information into the shared memory of the communications modem and the AP.

The feedback information is used to notify the TA that the communications modem has successfully obtained the network lock (or SIM lock) information.

906. The communications modem sends a security interrupt 2 to the AP.

907. The AP executes the TEE in the AP under a trigger of the security interrupt 2. Because there may be no task in the TEE environment of the AP during a preset time previously, the TEE environment can automatically enter the low-power consumption state. In this case, the TEE software or environment may enter the normal working state under the trigger of the interrupt 2.

908. After detecting the security interrupt 2, the TEE instructs the TA to process the security interrupt 2, and the TA obtains the feedback information stored in the shared memory of the communications modem and the AP.

After step 908, if the user initiates an unlock check for the network lock (or the SIM lock), the method further includes the following steps.

909. The CA sends an unlock password to the TA.

910. The TA receives the unlock password sent by the CA, and determines whether the unlock password is the same as an actual unlock password.

If the unlock password is the same as the actual unlock password, steps 911 to 913 are performed. If the unlock password is different from the actual unlock password, the TA returns unlock failure information to the CA.

911. The TA disables a network lock (or SIM lock) function, and stores indication information into the shared memory of the AP and the communications modem.

Specifically, the indication information is used to instruct the communications modem to clear the network lock (or SIM lock) information.

912. The TA sends a security interrupt 3 to the communications modem.

913. The communications modem receives the security interrupt 3 sent by the TA, obtains, from the shared memory of the communications modem and the AP, the indication information based on the security interrupt 3, and clears the network lock (or SIM lock) information based on the indication information.

In the prior art, network lock (or SIM lock) configuration is performed in the communications modem. Security of the communications modem is lower than that of the TA. Therefore, configuring the network lock (or SIM lock) information in the TA can improve security of the network lock (or SIM lock) information.

Figure 10:
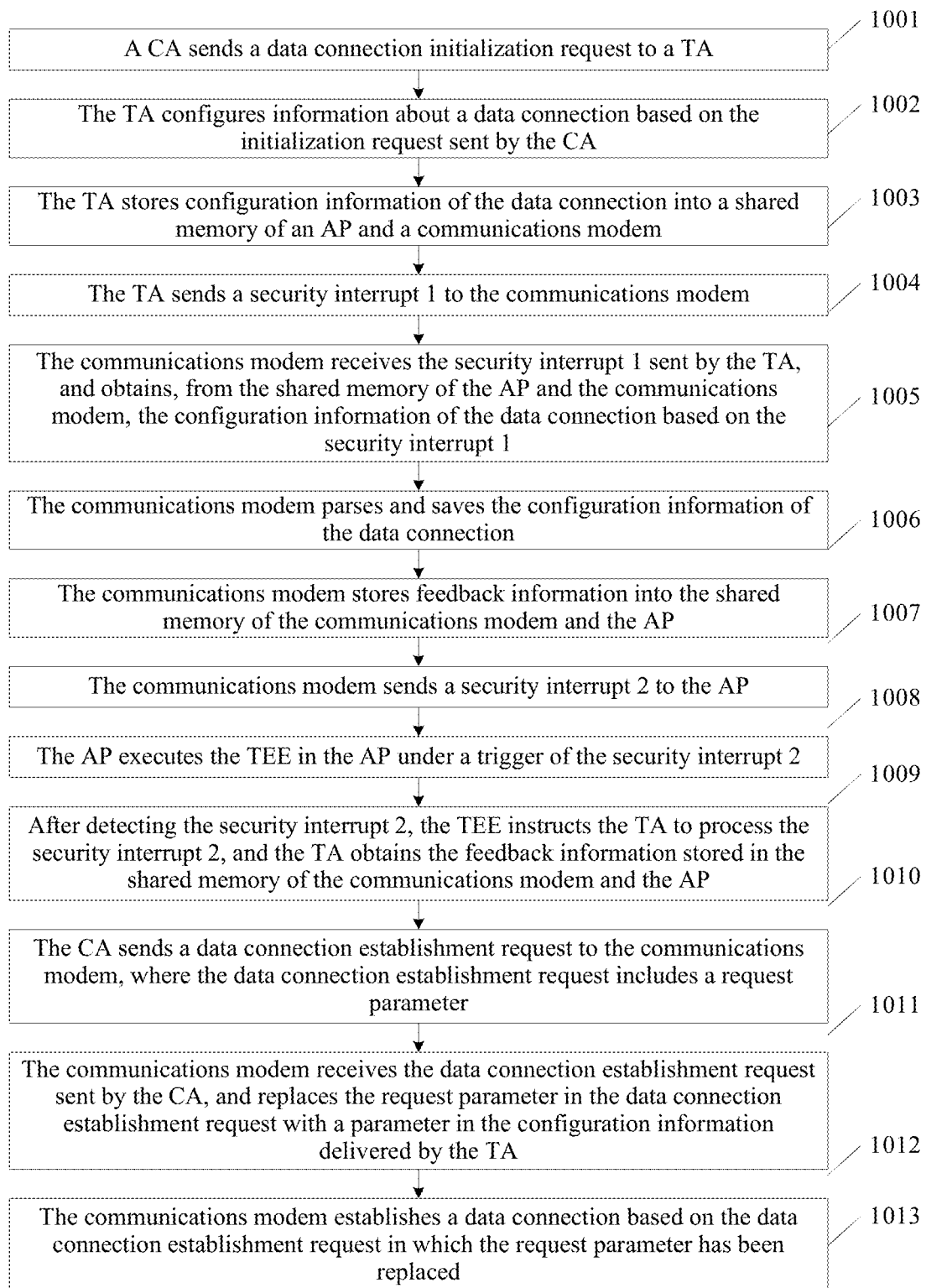
FIG. 10 is a flowchart of another secure data transmission method according to an embodiment of the present disclosure.

In another application scenario, to ensure security and correctness of data transmitted between the terminal device and an external network, the TA needs to establish a secure dial-up connection, and therefore the TEE needs to establish a secure data channel between the TEE and the communications modem. In this case, the dedicated communication signal processor is the communications modem. As shown in FIG. 10, the method includes the following steps.

1001. The CA sends a data connection initialization request to the TA.

Specifically, a trigger condition of step 1001 may be that a terminal device is to connect to a network.

1002. The TA configures information about a data connection based on the initialization request sent by the CA.

Specifically, the information about the data connection may be information such as a server address, a server port number, or a domain name system (DNS) address.

1003. The TA stores configuration information of the data connection into a shared memory of the AP and the communications modem.

1004. The TA sends a security interrupt 1 to the communications modem.

1005. The communications modem receives the security interrupt 1 sent by the TA, and obtains, from the shared memory of the AP and the communications modem, the configuration information of the data connection based on the security interrupt 1.

1006. The communications modem parses and saves the configuration information of the data connection.

1007. The communications modem stores feedback information into the shared memory of the communications modem and the AP.

The feedback information is used to notify the TA that the communications modem has successfully obtained the configuration information of the data connection.

1008. The communications modem sends a security interrupt 2 to the AP.

1009. The AP executes the TEE in the AP under a trigger of the security interrupt 2. Because there may be no task in the TEE environment of the AP during a preset time previously, the TEE environment can automatically enter the low-power consumption state. In this case, the TEE software or environment may enter the normal working state under the trigger of the interrupt 2.

1010. After detecting the security interrupt 2, the TEE instructs the TA to process the security interrupt 2, and the TA obtains the feedback information stored in the shared memory of the communications modem and the AP.

1011. The CA sends a data connection establishment request to the communications modem, where the data connection establishment request includes a request parameter.

1012. The communications modem receives the data connection establishment request sent by the CA, and replaces the request parameter in the data connection establishment request with a parameter in the configuration information delivered by the TA.

The request parameter in the data connection establishment request sent by the CA may be invalid or incorrect. Therefore, replacing the request parameter with the parameter in the configuration information delivered by the TA can improve data connection security.

1013. The communications modem establishes a data connection based on the data connection establishment request in which the request parameter has been replaced.

In the prior art, the configuration information is delivered by the CA to the communications modem. As a data transmission channel between the communications modem and the CA is insecure, the confirmation information may be intercepted or tampered with. In this application, the configuration information is delivered to the communications modem by the TA, and therefore configuration information security can be improved. In addition, the request parameter in the data connection establishment request sent by the CA may be invalid or incorrect. Therefore, replacing the request parameter delivered by the CA to the communications modem with the parameter in the configuration information can improve the data connection security.

In the embodiments of the present disclosure, optionally, when the AP exchanges data with the dedicated communication signal processor in the TEE environment, actually, some addresses in the shared memory or used to share the data or information in the memory can be accessed only by the TEE environment or the TA in the AP, and cannot be accessed by the REE or the CA, so as to ensure security. In other words, in this case, a physical attribute of the shared memory is a security enabled state, that is, a high-security-level state.

In the embodiments provided in this application, it should be understood that, the disclosed apparatus and method may be implemented by using another manner. The displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or a part of the steps of the methods described in the embodiments of this application. The foregoing storage medium includes any medium that can store program code, such as a USB flash drive, a removable hard disk, a ROM, a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A secure data transmission apparatus, comprising:
   a dedicated communication signal processor and an application processor;
   wherein the dedicated communication signal processor is configured to send a first security interrupt to the application processor;
   wherein the application processor is configured to:
      execute rich execution environment (REE) software comprising a client application (CA) that runs in REE,
      execute trusted execution environment (TEE) software under a trigger of the first security interrupt, wherein the TEE software comprises a trusted application (TA) that runs in TEE, and
      under driving of the TA, obtain first information from a shared memory of the dedicated communication signal processor and the application processor based on the first security interrupt, wherein the first information is information that the dedicated communication signal processor needs to transfer to the application processor, and wherein a security of the TEE software is higher than a security of the REE software;
   wherein the dedicated communication signal processor is further configured to:
      receive a second security interrupt sent by the application processor, and
      obtain second information from the shared memory based on the second security interrupt, wherein the second information is information that the application processor needs to transfer to the dedicated communication signal processor; and
   wherein the application processor is further configured to send the second security interrupt to the dedicated communication signal processor under the driving of the TA.

2. The secure data transmission apparatus according to claim 1, further comprising the shared memory.

3. The secure data transmission apparatus according to claim 1, wherein the application processor is further configured to start the TEE based on a TEE startup parameter comprising an address index in the shared memory.

4. The secure data transmission apparatus according to claim 3, further comprising:
   a read-only memory (ROM) configured to store a startup program of the secure data transmission apparatus; and
   wherein the application processor is further configured to configure the TEE startup parameter in a booting process of the startup program.

5. The secure data transmission apparatus according to claim 1, wherein:
   the second information is configuration information of a parameter specific to the dedicated communication signal processor; and
   a priority of the configuration information that the application processor transfers to the dedicated communication signal processor under driving of the TA is higher than a priority of configuration information that the application processor transfers to the dedicated communication signal processor under driving of the CA.

6. The secure data transmission apparatus according to claim 5, wherein the parameter comprises at least one of an Internet Protocol (IP) type, an access point name (APN), a user name, a password, an authentication type, or quality of service (QoS).

7. The secure data transmission apparatus according to claim 1, wherein the dedicated communication signal processor is a communications modem, a Bluetooth processor, a wireless fidelity (WiFi) processor, or a voice processor.

8. The secure data transmission apparatus according to claim 1, wherein the first information is indication information used to instruct the application processor to operate correspondingly based on content of the indication information.

9. The secure data transmission apparatus according to claim 1, wherein the first information is feedback information used to feedback, to the application processor, a processing result of the second information processed by the dedicated communication signal processor.

10. The secure data transmission apparatus according to claim 1, wherein the first information is first data information and the application processor is capable of processing the first data information based on a type of the first data information.

11. The secure data transmission apparatus according to claim 10, wherein the first data information is short message service (SMS) message data or voice data.

12. The secure data transmission apparatus according to claim 1, wherein the second information is indication information is used to instruct the dedicated communication signal processor to operate correspondingly based on content of the indication information.

13. The secure data transmission apparatus according to claim 1, wherein the second information is feedback information used to feedback, to the dedicated communication signal processor, a processing result of the first information processed by the application processor.

14. The secure data transmission apparatus according to claim 1, wherein the second information is second data information, and the dedicated communication signal processor is capable of processing the second data information based on a type of the second data information.

15. The secure data transmission apparatus according to claim 14, wherein the second data information is network lock or SIM lock configuration information, data connection configuration information, or phone number information.

16. A secure data transmission method, comprising:
storing, by a dedicated communication signal processor, first information into a shared memory of the dedicated communication signal processor and an application processor, wherein the first information is information that the dedicated communication signal processor needs to transfer to the application processor;
sending, by the dedicated communication signal processor, a first security interrupt to the application processor;
executing, by the application processor, trusted execution environment (TEE) software in the application processor under a trigger of the first security interrupt, wherein the TEE software comprises a trusted application (TA) that runs in TEE;
executing, by the application processor, rich execution environment (REE) software comprising a client application (CA) that runs in REE, and wherein a security of the TEE software is higher than a security of the REE software;
obtaining, by the application processor, the first information from the shared memory based on the first security interrupt under driving of the TA;
storing, by the application processor, second information into the shared memory under the driving of the TA, and sending a second security interrupt to the dedicated communication signal processor, wherein the second information is information that the application processor needs to transfer to the dedicated communication signal processor; and
obtaining, by the dedicated communication signal processor, the second information from the shared memory based on the second security interrupt that is received from the application processor.

17. The method according to claim 16, wherein:
both the application processor and the dedicated communication signal processor are disposed in a secure data transmission apparatus comprising a read-only memory (ROM) comprising a startup program; and
the method further comprises:
configuring, by the application processor, a TEE startup parameter in a booting process of the startup program, wherein the TEE startup parameter comprises an address index in the shared memory, and
starting, by the application processor, the TEE based on the TEE startup parameter.

18. The method according to claim 16, wherein:
the second information is configuration information of a parameter specific to the dedicated communication signal processor, and
a priority of the configuration information that the application processor transfers to the dedicated communication signal processor under driving of the TA is higher than a priority of configuration information that the application processor transfers to the dedicated communication signal processor under driving of the CA.

19. The method according to claim 18, wherein the parameter comprises at least one of an Internet Protocol (IP) type, an access point name (APN), a user name, a password, an authentication type, or quality of service (QoS).

20. The method according to claim 16, wherein the dedicated communication signal processor is a communications modem, a Bluetooth processor, a wireless fidelity (WiFi) processor, or a voice processor.

21. The method according to claim 16, wherein:
when the first information is indication information, the first information is used to instruct the application processor to operate correspondingly based on content of the indication information;
when the first information is feedback information, the first information is used to feedback, to the application processor, a processing result of the second information processed by the dedicated communication signal processor; or
when the first information is first data information, the application processor is capable of processing the first data information based on a type of the first data information.

22. The method according to claim 21, wherein the first data information is short message service (SMS) message data or voice data.

23. The method according to claim 16, wherein:
when the second information is indication information, the second information is used to instruct the dedicated communication signal processor to operate correspondingly based on content of the indication information;
when the second information is feedback information, the second information is used to feedback, to the dedicated communication signal processor, a processing result of the first information processed by the application processor; or
when the second information is second data information, the dedicated communication signal processor is capable of processing the second data information based on a type of the second data information.

24. The method according to claim 23, wherein the second data information is network lock or SIM lock configuration information, data connection configuration information, or phone number information.

* * * * *